F. Gerfen,
Hay Knife.
N° 78,369. Patented May 26, 1868.

Witnesses:
A. M. Rambo
Henry Gerfen

Inventor:
Frederick Gerfen

United States Patent Office.

FRIEDERICK GERFEN, OF WEST HEMPFIELD TOWNSHIP, PENNSYLVANIA.

*Letters Patent No. 78,869, dated May 26, 1868.*

IMPROVEMENT IN HAY-CUTTER.

The Schedule referred to in these Letters Patent and making part of the same.

TO ALL WHOM IT MAY CONCERN:

Be it known that I, FRIEDERICK GERFEN, of West Hempfield township, in the county of Lancaster, and State of Pennsylvania, have invented a new and useful "Improvement in Hay-Cutters;" and I do hereby declare that the following is a clear, full, and exact description thereof, reference being had to the accompanying drawings, and to the letters of reference marked thereon, in which—

Figure 1:
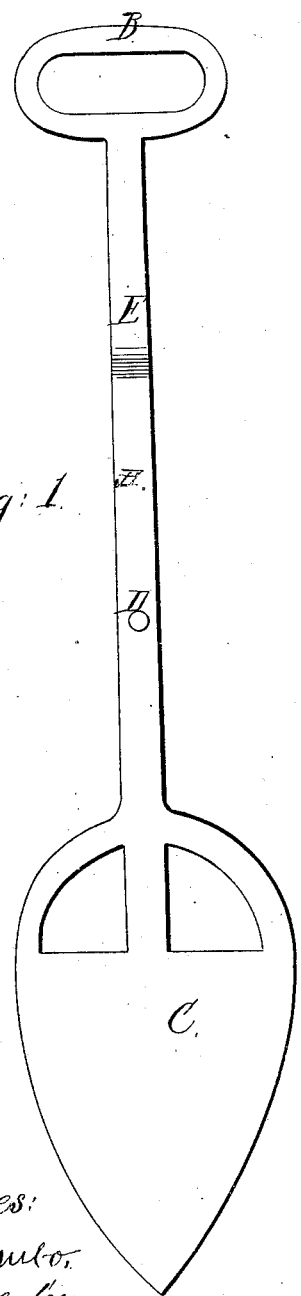
Figure 1 is a front view.
Figure 2:
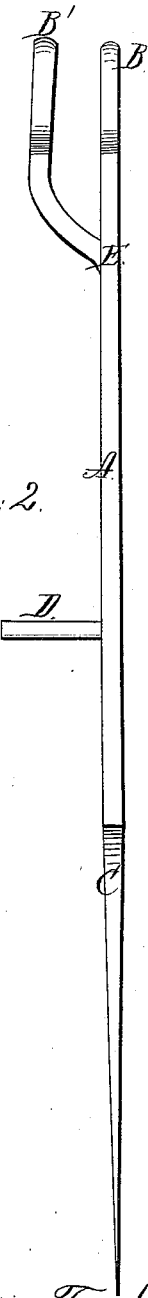
Figure 2 is a side elevation of my "improvement in hay-cutters."

A represents a shaft, to one end of which is attached an ordinary handle, B. At the point marked E, on said shaft A, is attached a supplemental handle, B', which, when taken hold of by the operator, causes the shaft A and handle B to serve as a guard, and protect the hand from being rubbed either by the hay or mow.

More force can also thus be applied to the "cutter," as both hands can be used, and the operator can take hold of both handles.

And at the lower end is the steel knife or egg-shaped blade, C, directly above which is the second handle, D, screwed into and projecting from the shaft.

My "improved hay-cutter" is intended to be used in cutting hay from the mow, and is calculated to obviate and remedy some serious objections to the hay-cutters now in use.

Those generally used are so constructed as to be wholly inoperative in a confined space, as they require to be swung, and consequently cannot be effectively used unless the operator has room in which to swing the implement, and where the hay is mowed away in lofts of barns, there is considerable difficulty experienced in getting out sufficient to make room to use the ordinary cutters.

It will be easily seen and understood that, owing to the peculiar shape of the knife of my cutter, no swinging is required, as it is only necessary to introduce the point of the blade and apply the proper pressure to the handle, to cut to any required shape or quantity.

The handle D is screwed into the shaft, in such a manner that it may be removed, and, when fixed, serves as a foothold to allow of greater pressure being brought to bear upon the blade, if required, but may be used or not, at the option of the operator.

My "improved hay-cutter" is cheap, and simple in construction, and possesses great durability, the blade being composed of iron and steel, and the remaining parts wholly of iron.

What I claim as my invention, and desire to secure by Letters Patent, is—

The "hay-cutter," constructed and arranged substantially as and for the purpose specified.

In testimony whereof, I have hereunto set my hand and seal, this 11th day of May, A. D. one thousand eight hundred and sixty-eight.

FRIEDERICK GERFEN. [L. S.]

Witnesses:
HENRY GERFEN,
SAMUEL B. HINKLE.